(12) United States Patent
Kuo et al.

(10) Patent No.: US 11,920,050 B2
(45) Date of Patent: Mar. 5, 2024

(54) SELF-CURABLE AND LOW TEMPERATURE CURABLE COATING COMPOSITIONS

(71) Applicant: Eastman Chemical Company, Kingsport, TN (US)

(72) Inventors: Thauming Kuo, Kingsport, TN (US); Nick Allen Collins, Fall Branch, TN (US)

(73) Assignee: Eastman Chemical Company, Kingsport, TN (US)

( * ) Notice: Subject to any disclaimer, the term of this patent is extended or adjusted under 35 U.S.C. 154(b) by 236 days.

(21) Appl. No.: 17/309,121

(22) PCT Filed: Dec. 6, 2019

(86) PCT No.: PCT/US2019/064870
§ 371 (c)(1),
(2) Date: Apr. 27, 2021

(87) PCT Pub. No.: WO2020/123279
PCT Pub. Date: Jun. 18, 2020

(65) Prior Publication Data
US 2022/0243090 A1    Aug. 4, 2022

Related U.S. Application Data

(60) Provisional application No. 62/777,880, filed on Dec. 11, 2018.

(51) Int. Cl.
*C09D 167/06* (2006.01)

(52) U.S. Cl.
CPC .................. *C09D 167/06* (2013.01)

(58) Field of Classification Search
CPC ... C09D 167/06; C08G 63/553; C08G 63/918
See application file for complete search history.

(56) References Cited

U.S. PATENT DOCUMENTS

| | | |
|---|---|---|
| 4,071,578 A | 1/1978 | Lasher |
| 4,708,821 A | 11/1987 | Shimokawa et al. |
| 5,288,802 A | 2/1994 | Walters et al. |
| 5,288,804 A | 2/1994 | Kim et al. |
| 5,426,148 A | 6/1995 | Tucker |
| 5,453,464 A | 9/1995 | Witzeman et al. |
| 5,462,992 A | 10/1995 | Wilt et al. |
| 5,693,705 A | 12/1997 | Kubo et al. |
| 5,714,563 A | 2/1998 | DePompei et al. |
| 6,057,001 A | 5/2000 | Schoonderwoerd et al. |
| 6,117,492 A | 9/2000 | Goldstein et al. |
| 6,177,514 B1 | 1/2001 | Pathak et al. |
| 6,203,607 B1 | 3/2001 | Schoonderwoerd et al. |
| 6,521,716 B1 | 2/2003 | Leake |
| 6,683,132 B1 | 1/2004 | Schick et al. |
| 8,653,174 B2 | 2/2014 | Anderson et al. |
| 8,664,333 B2 | 3/2014 | Shibutani et al. |
| 8,962,725 B2 | 2/2015 | Brinkhuis et al. |
| 9,181,452 B2 | 11/2015 | Brinkhuis et al. |
| 9,181,453 B2 | 11/2015 | Brinkhuis et al. |
| 9,260,626 B2 | 2/2016 | Brinkhuis et al. |
| 9,284,423 B2 | 3/2016 | Brinkhuis et al. |
| 9,534,081 B2 | 1/2017 | Brinkhuis et al. |
| 9,587,138 B2 | 3/2017 | Brinkhuis et al. |
| 9,598,602 B2 | 3/2017 | Kevil et al. |
| 9,650,539 B2 | 5/2017 | Kuo et al. |
| 10,563,040 B2 | 2/2020 | Kuo et al. |
| 11,261,359 B2 | 3/2022 | Boggs et al. |
| 11,434,400 B2 | 9/2022 | Dougherty et al. |
| 11,447,670 B2 | 9/2022 | Kuo et al. |
| 11,459,493 B2 | 10/2022 | Carvagno et al. |
| 11,530,342 B2 | 12/2022 | Dougherty et al. |
| 11,732,165 B2 | 8/2023 | Kuo et al. |
| 11,810,923 B2 | 11/2023 | Chen et al. |
| 2002/0040093 A1 | 4/2002 | Hobel et al. |
| 2002/0161162 A1 | 10/2002 | Kumar et al. |
| 2003/0060655 A1 | 3/2003 | Hayashi et al. |
| 2003/0195304 A1 | 10/2003 | Kuo et al. |
| 2003/0195305 A1 | 10/2003 | Kuo et al. |
| 2005/0081994 A1 | 4/2005 | Beckley et al. |
| 2007/0048337 A1 | 3/2007 | Arthur |
| 2008/0135060 A1 | 6/2008 | Kuo et al. |
| 2009/0253865 A1 | 10/2009 | Shibutani et al. |
| 2010/0204401 A1 | 8/2010 | Marsh et al. |

(Continued)

FOREIGN PATENT DOCUMENTS

| | | | |
|---|---|---|---|
| DE | 196 20 351 A1 | 11/1997 | |
| EP | 0 161 697 A1 | 11/1985 | |

(Continued)

OTHER PUBLICATIONS

Co-pending U.S. Appl. No. 15/621,323, filed Jun. 13, 2017; Kuo et al.; now U.S. Pat. No. 10,563,040.
Office Action dated Feb. 25, 2019 received in co-pending U.S. Appl. No. 15/621,323.
Office Action dated Jul. 15, 2019 received in co-pending U.S. Appl. No. 15/621,323.
Notice of Allowance dated Oct. 24, 2019 received in co-pending U.S. Appl. No. 15/621,232.
Co-pending U.S. Appl. No. 17/309,118, filed Apr. 27, 2021; Kuo et al.
Co-pending U.S. Appl. No. 16/705,331, filed Dec. 6, 2019; now U.S. Publication No. 2020-0181465; Kuo et al.
Co-pending U.S. Appl. No. 16/705,338, filed Dec. 6, 2019; now U.S. Publication No. 2020-0181311; Carvagno et al.

(Continued)

*Primary Examiner* — Robert S Jones, Jr.
*Assistant Examiner* — Jiangtian Xu
(74) *Attorney, Agent, or Firm* — Judith C. Rawls

(57) ABSTRACT

Polyesters having both α,β-unsaturated groups and moieties containing activated methylene or methine groups, such as those of beta-ketoester and malonate, are curable in the presence of a base catalysts to form crosslinked networks. Formulations based on such polyesters are suitable for use in coatings and cure at temperatures less than 230° C. without the use of isocyanates.

16 Claims, No Drawings

(56) References Cited

U.S. PATENT DOCUMENTS

| | | | |
|---|---|---|---|
| 2011/0015343 A1 | 1/2011 | Jones et al. | |
| 2012/0220676 A1 | 8/2012 | Moens | |
| 2013/0036939 A1 | 2/2013 | Webster et al. | |
| 2013/0233739 A1* | 9/2013 | Zhao | B65D 25/14 524/451 |
| 2015/0024195 A1 | 1/2015 | Bammel et al. | |
| 2016/0068707 A1 | 3/2016 | Drijfhout | |
| 2016/0115345 A1 | 4/2016 | Kuo et al. | |
| 2016/0115347 A1* | 4/2016 | Kuo | C08G 8/08 524/596 |
| 2016/0137877 A1 | 5/2016 | Kuo et al. | |
| 2016/0297994 A1 | 10/2016 | Kuo et al. | |
| 2017/0275492 A1 | 9/2017 | Zhou et al. | |
| 2018/0163081 A1 | 6/2018 | Goedegebuure et al. | |
| 2018/0251656 A1 | 9/2018 | Geodegebuure et al. | |
| 2020/0140693 A1 | 5/2020 | Gessner et al. | |
| 2020/0181311 A1 | 6/2020 | Carvagno et al. | |
| 2020/0181312 A1 | 6/2020 | Dougherty et al. | |
| 2020/0181324 A1 | 6/2020 | Dougherty et al. | |
| 2020/0181338 A1 | 6/2020 | Collins et al. | |
| 2020/0181395 A1 | 6/2020 | Dougherty et al. | |
| 2020/0181465 A1 | 6/2020 | Kuo et al. | |
| 2021/0388229 A1 | 12/2021 | Kuo et al. | |

FOREIGN PATENT DOCUMENTS

| | | |
|---|---|---|
| EP | 0 687 716 A1 | 12/1995 |
| EP | 1 435 383 A1 | 7/2004 |
| GB | 1 154 725 A | 6/1969 |
| JP | S56 5847 A | 1/1981 |
| JP | 3284984 A | 12/1991 |
| JP | H07331133 A | 12/1995 |
| JP | H11310723 A | 11/1999 |
| JP | 3386577 A | 3/2003 |
| WO | WO 96/41833 A1 | 12/1996 |
| WO | WO 2016/166369 A1 | 10/2016 |
| WO | WO 2017/186899 A1 | 11/2017 |
| WO | WO 2018/002538 A1 | 1/2018 |
| WO | WO 2018/231601 A1 | 12/2018 |
| WO | WO 2020/123278 A1 | 6/2020 |

OTHER PUBLICATIONS

Office Action dated Mar. 17, 2022 received in co-pending U.S. Appl. No. 16/705,338.
Co-pending U.S. Appl. No. 16/705,345, filed Dec. 6, 2019; now U.S. Publication No. 2020-0181324; Dougherty et al.
Co-pending U.S. Appl. No. 16/705,351, filed Dec. 6, 2019; now U.S. Publication No. 2020-0181395; Dougherty et al.
Co-pending U.S. Appl. No. 16/705,365, filed Dec. 6, 2019; now U.S. Publication No. 2020-0181446; Boggs et al.
Non-Final Office Communication dated Jun. 9, 2021 received in U.S. Appl. No. 16/705,365.
Notice of Allowance and Fee(s) Due dated Oct. 22, 2021 received in U.S. Appl. No. 16/705,365.
Co-pending U.S. Appl. No. 16/705,377, filed Dec. 6, 2019; now U.S. Publication No. 2020-0181312;Dougherty et al.
Office Action dated Mar. 17, 2022 received in co-pending U.S. Appl. No. 16/705,377.
Co-pending U.S. Appl. No. 16/705,394, filed Dec. 6, 2019; now U.S. Publication No. 2020-0181338; Collins et al.
Co-pending U.S. Appl. No. 16/705,324, filed Dec. 6, 2019; now U.S. Publication No. 2020-0109321; Kuo et al.
Office Communication dated Jun. 14, 2021 received in U.S. Appl. No. 16/705,324.
Office Communication dated Jan. 7, 2022 received in U.S. Appl. No. 16/705,324.
ASTM D1003; Standard Test Method for Haze and Luminous Transmittance of Transparent Plastics; Nov. 2013.
ASTM D2578; Standard Test Method for Wetting Tension of Polyethylene and Polypropylene Films; Dec. 2017.
ASTM D3236; Standard Test Method for Apparent Viscosity of Hot Melt Adhesives and Coating Materials; Apr. 2015.
ASTM D3985; Standard Test Method for Oxygen Gas Transmission Rate Through Plastic Film and Sheeting Using a Coulometric Sensor; Nov. 2017.
ASTM D4366; Standard Test Method for Hardness of Organic Coatings by Pendulum Damping Tests; Dec. 2016.
ASTM D4752-10; Standard Practice for Measuring MEK Resistance of Ethyl Silicate (Inorganic) Zinc-Rich Primers by Solvent Rub; Feb. 2015.
ASTM D5402; Standard Practice for Assessing the Solvent Resistance of Organic Coatings Using Solvent Rubs; Jun. 2015.
ASTM D6493-11; Standard Test Methods for Softening Point of Hydrocarbon Resins and Rosin Based Resins by Automated Ring-and-Ball Apparatus; Dec. 2015.
ASTM D7253-16; Standard Test Method for Polyurethane Raw Materials: Determination of Acidity as Acid Number for Polyether Polyols; Sep. 2016.
ASTM D974; Standard Test Method for Acid and Base Number by Color-Indicator Titration; Dec. 2014.
ASTM E222-17; Standard Test Methods for Hydroxyl Groups Using Acetic Anhydride Acetylation; Jun. 2017.
ASTM F1249; Standard Test Method for Water Vapor Transmission Rate Through Plastic Film and Sheeting Using a Modulated Infrared Sensor; Oct. 2013.
ASTM F2622; Standard Test Method for Oxygen Gas Transmission Rate Through Plastic Film and Sheeting Using Various Sensors; Oct. 2013.
ASTM G155; Standard Practice for Operating Xenon Arc Light Apparatus for Exposure of Non-Metallic Materials; Jun. 2013.
Blank et al.; "Delayed (Latent) Catalysis in Coatings;" www.researchgate.net/publication/228420884.
Brinkhuis et al.; "Taming the Michael Addition reaction;" European Coatings Journal; 05; 2015; pp. 34-40.
Dow Coating Materials; "Advances in 2K ISO-Free[1] Urethane Coating Technology;" May 19, 2015; pp. 1-30.
Invitation to Pay Additional Fees with dated Aug. 23, 2018 received in International Application No. PCT/US2018/036237.
Noomen; "Applications of Michael addition chemistry in coatings technology"; Progress in Organic Coatings; 32; (1997); pp. 137-142.
Notification of Transmittal of the International Search Report and the Written Opinion of the International Searching Authority with dated Aug. 24, 2018 for International Application No. PCT/US2018/036244.
Notification of Transmittal of the International Search Report and the Written Opinion of the International Searching Authority with dated Nov. 6, 2018 for International Application No. PCT/US2018/036237.
Notification of Transmittal of the International Search Report and the Written Opinion of the International Searching Authority with dated Feb. 24, 2020 for International Application No. PCT/US2018/060816.
Notification of Transmittal of the International Search Report and the Written Opinion of the International Searching Authority with dated Feb. 25, 2020 for International Application No. PCT/US19/64868.
Notification of Transmittal of the International Search Report and the Written Opinion of the International Searching Authority with dated Apr. 7, 2020 for International Application No. PCT/US19/64870.
Notification of Transmittal of the International Search Report and the Written Opinion of the International Searching Authority with dated Mar. 20, 2020 for International Application No. PCT/US2019/064872.
Notification of Transmittal of the International Search Report and the Written Opinion of the International Searching Authority with dated Jun. 2, 2020 for International Application No. PCT/US2019/064876.
Notification of Transmittal of the International Search Report and the Written Opinion of the International Searching Authority with dated Mar. 20, 2020 for International Application No. PCT/US2019/064878.

(56) References Cited

OTHER PUBLICATIONS

Notification of Transmittal of the International Search Report and the Written Opinion of the International Searching Authority with dated Mar. 20, 2020 for International Application No. PCT/US2019/064883.
Notification of Transmittal of the International Search Report and the Written Opinion of the International Searching Authority with dated Mar. 20, 2020 for International Application No. PCT/US2019/064893.
Wicks et al.; "Chapter 13—Polyester Resins"; Organic Coatings Science and Technology; 2nd ed.; pp. 246-257; Wiley, New York, 1999.
Witzeman et al.; "Comparison of Methods for the Preparation of Acetoacetylated Coating Resins"; Journal of Coatings Technology; vol. 62; No. 789; pp. 101-112 (1990).
Yamamoto et al.; "Iridium-Catalyzed Oxidative Methyl Esterification of Primary Alcohols and Diols with Methanol;" Journal of Organic Chemistry; vol. 76; No. 8; Apr. 15, 2011; pp. 2937-2941.
Office Action dated Mar. 29, 2022 received in co-pending U.S. Appl. No. 16/705,331; Now U.S. Publication No. 2020-0181465; Kuo et al.
Notice of Allowance dated Aug. 3, 2022 received in co-pending U.S. Appl. No. 16/705,331.
Notice of Allowance dated Aug. 23, 2022 received in co-pending U.S. Appl. No. 16/704,338.
Office Action dated Apr. 1, 2022 received in co-pending U.S. Appl. No. 16/705,345.
Office Action dated Aug. 22, 2022 received in co-pending U.S. Appl. No. 16/705,345.
Office Action dated Feb. 22, 2022 received in co-pending U.S. Appl. No. 16/705,351.
USPTO Office Action dated Jun. 9, 2022 received in U.S co-pending U.S. Appl. No. 16/705,394.
USPTO Office Action dated Feb. 15, 2023 received in U.S. co-pending U.S. Appl. No. 16/705,394.
USPTO Office Action dated May 11, 2022 received in U.S. co-pending U.S. Appl. No. 16/705,324.
USPTO Office Action dated Oct. 20, 2022 received in U.S. co-pending U.S. Appl. No. 16/705,324.
"Photogenerated Base in Polymer Curing & Imaging: Radiation-induce Crosslinking via a Knoevenagel Reaction" authored by Urankar et al. and published in Polymer Preprints (1994) 35, 933-934.
Notice of Allowance dated Jul. 27, 2023 received in co-pending U.S. Appl. No. 16/705,345.
European Search Report Application No. 19896953.7 dated Sep. 12, 2022.
European Search Report Application No. 19895110.5 dated Sep. 16, 2022.

\* cited by examiner

SELF-CURABLE AND LOW TEMPERATURE CURABLE COATING COMPOSITIONS

FIELD OF THE INVENTION

This invention pertains to polyesters. In some embodiments, this invention pertains to self-curing and low temperature curing polyesters for use in coating compositions.

BACKGROUND OF THE INVENTION

Thermosetting compositions based on isocyanate crosslinkers are widely used for coating and adhesive applications. Such systems are curable at room temperature or low temperatures (e.g. <80° C.) and are capable of providing the desirable properties for a variety of applications. However, there have been increasing health concerns associated with the production and the use of isocyanate compounds and the formulations based on isocyanates. Thus, there is a need for a crosslinking system that is isocyanate free. Further, it is desirable that the system not generate by-products upon crosslinking, which can be detrimental to film formation or other desirable properties. Since the isocyanate crosslinkers are generally used for low-temperature curing, in order to replace them, the new system must be curable at similar temperatures. This is particularly challenging because organic reactions generally require the use of heat to overcome the energy that is needed for the reactions to occur. This invention provides a novel crosslinking system that is isocyanate free, curable at low temperatures, has low Volatile Organic Components (VOC), and is suitable for applications in coatings, such as automotive, industrial maintenance, and furniture. The low-temperature curable composition is especially suitable for field-applied industrial maintenance coatings, automotive refinish coatings, wood coatings, and marine craft gelcoats.

SUMMARY OF THE INVENTION

In one embodiment, this invention is a coating composition comprising:
A. an acetoacetate-functionalized unsaturated polyester comprising the reaction product of:
  I. an unsaturated polyester in an amount from about 50 to about 97 weight percent, based on the total weight of (I) and (II), comprising the residues of:
    a. a hydroxyl component comprising:
      i. 2,2,4,4-tetramethylcyclobutane-1,3-diol (TMCD) in an amount ranging from 10 to 90 mole %, based on the total moles of (i), (ii), and (iii),
      ii. a diol other than TMCD in an amount ranging from 10 to 90 mole percent, based on the total moles of (i), (ii), and (iii), and
      iii. a polyol in an amount ranging from 0 to 50 mole percent, based on the total moles of (i), (ii), and (iii);
    b. an α,β-unsaturated carboxyl compound;
    c. hexahydrophthalic anhydride (HHPA); and
    d. optionally a third carboxyl component in addition to (b) and (c), other than said α,β-unsaturated carboxyl compound and said HHPA wherein said optional third carboxyl component is a polycarboxylic acid compound, a derivative of polycarboxylic acid compound, or a combination thereof; and
  II. an alkyl acetoacetate and/or diketene in an amount ranging from about 3 to about 50 weight percent, based on the total weight of (I) and (II); and
B. a basic catalyst.

DETAILED DESCRIPTION

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifications and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "residue", as used herein in reference to the polymers described herein, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid monomer or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half esters, salts, half salts, anhydrides, mixed anhydrides, or mixtures thereof, useful in a polycondensation process with a diol to make a curable, aliphatic polyester.

The term "α,β-unsaturated carboxyl compound" as used herein means a compound having at least one carboxylic acid or anhydride group, and having at least one unsaturation in the position that is α,β relative to a carbonyl group and not located on an aromatic ring.

The present inventors have discovered that polyesters having both α,β-unsaturated groups and moieties containing activated methylene or methine groups, such as those of beta-ketoacetate and malonate, are self-curable in the presence of a basic catalyst. As used herein the term "self-curable polyesters" is intended to mean polyesters that are curable at temperatures from about room temperature to about 230° C. to form crosslinked networks. Formulations based on such polyesters are suitable for coatings, which have the much-desired characteristics of low-temperature curing without the use of isocyanates.

In one embodiment of the present invention, there is provided a coating composition comprising:
A. a self-curable polyester comprising the residues of
  I. a first compound having an α,β-unsaturated group and
  II. a second compound having an activated methylene or methine group,
wherein the first compound is an α,β-unsaturated carboxyl compound having at least one carboxylic acid or anhydride group, and having at least one unsaturation in the position that is α,β relative to said carboxylic acid or anhydride group and not located on an aromatic ring; and wherein the second compound is one or more compounds selected from the group consisting of diketene, β-ketotoester, and malonate; and
B. a basic catalyst.

The polyester has a reactive functional group, typically a hydroxyl group or carboxyl group, used for the purpose of later reacting with a crosslinker in a coating formulation. The functional group is controlled by having either excess hydroxyl (from diol or polyol) or acid (from dicarboxylic acid or tricarboxylic acid) in the polyester resin composition. The desired crosslinking pathway will determine whether the polyester resin will be hydroxyl-terminated or carboxylic acid-terminated. This concept is known to those skilled in the art and described, for example, in *Organic Coatings Science and Technology*, 2nd ed., p. 246-257, by Z. Wicks, F. Jones, and S. Pappas, Wiley, New York, 1999.

In some embodiments, first compound (I) is α,β-unsaturated carboxyl compound such as, but are not limited to, maleic anhydride, maleic acid, fumaric acid, itaconic anhydride, itaconic acid, citraconic anhydride, citraconic acid, aconitic acid, aconitic anhydride, oxalocitraconic acid and its anhydride, mesaconic acid or its anhydride, phenyl maleic acid or its anhydride, t-butyl maleic acid or its anhydride, monomethyl fumarate, monobutyl fumarate, methyl maleic acid or its anhydride, or mixtures thereof. In addition, the esters of said acids such as, for example, dimethyl maleate, dimethyl fumarate, dimethyl itaconate, diethyl maleate, diethyl fumarate, diethyl itaconate, and the like are also suitable.

In other embodiments, first compound (I) is selected from the group consisting of maleic anhydride, maleic acid, fumaric acid, itaconic acid, and itaconic anhydride.

The second compound (II) having an activated methylene or methine group is a compound having a functionality selected from the group of diketene (Formula 1), β-ketotoester (Formula 2), and malonate (Formula 3), wherein R is an alkyl group, R' and R" are each independently hydrogen or alkyl group.

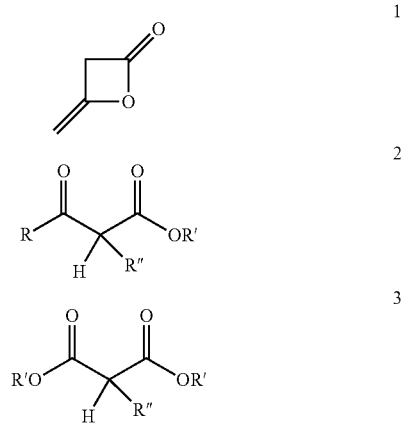

Examples of the second compound (II) include diketene, t-butyl acetoacetate, methyl acetoacetate, ethyl acetoacetate, n-propyl acetoacetate, isopropyl acetoacetate, n-butyl acetoacetate, malonic acid, dimethyl malonate, and diethyl malonate.

In one embodiment, the self-curable polyester (A) is an acetoacetate-functional polyester having one or more α,β-unsaturated groups in the polyester backbone. Such a polyester can be prepared by reacting an α,β-unsaturated group containing polyester polyol, for example, a polyester having a hydroxyl number of at least 5, desirably a hydroxyl number of about 30 to 200, with diketene or a compound having the beta-ketoacetate moiety such as t-butyl acetoacetate (tBAA). Various methods for the preparation of acetoacetylated polyester coating resins have been described by Witzeman et al. in the Journal of Coatings Technology, Vol. 62, No. 789, pp. 101-112 (1990). Suitable amounts of each in a reaction mixture include from about 60 to about 97, 70 to 97, 80 to 94, or 85 to 90 wt. % of the polyester resin and from about 3 to about 40, 3 to 30, 6 to 20, or 10 to 15 wt. % of the compound having a beta-ketoacetate moiety or a diketene can be reacted together, wherein the weight percents are based on the total weight of the polyester resin and the compound having the beta-ketoacetate moiety.

In another embodiment, said acetoacetate functional polyester comprises the reaction product (or residues) of (1) from about 50 to about 97 weight percent of an α,β-unsaturated group containing polyester polyol and (2) from about 3 to about 50 weight percent of an alkyl acetoacetate or diketene, wherein the weight percentages are based on the total weight of (1) and (2).

In another embodiment, said α,β-unsaturated group containing polyester polyol (1) has a hydroxyl number of at least 5 mgKOH/g. In another embodiment the polyester polyol (1) has a hydroxyl number of 30 to 200. In yet another embodiment the polyester polyol (1) has a hydroxyl number of 50 to 150. The weight percent of (1) may be 50 to 97, 60 to 95, 65 to 93, 70 to 90, or 75 to 88 and (2) may be 3 to 50, 5 to 40, 7 to 35, 10 to 30, or 12 to 25.

Desirably, the acid number of the α,β-unsaturated group containing polyester polyol (1) is from 0 to about 15, from 0 to about 10, or from 0 to 5 mg KOH/g. Low acid numbers are desirable since the curable composition of the invention requires the use of a base catalyst. Higher acid numbers can deactivate the base catalyst.

Said α,β-unsaturated group containing polyester polyol in turn can be prepared by reacting the first compound (I) having an α,β-unsaturated group, such as maleic anhydride, with other monomers typically used for polyester synthesis.

Thus, in a further embodiment, this invention provides a self-curable polyester, which is an acetoacetate-functionalized unsaturated polyester comprising the reaction product of:

I. an unsaturated polyester in an amount from about 50 to about 97 weight percent, based on the total weight of (1) and (II), comprising the residues of
   a. a hydroxyl component comprising
      i. a diol in an amount ranging from 50 to 100 mole percent, based on the total moles of (i) and (ii), and
      ii. a polyol in an amount ranging from 0 to 50 mole percent, based on the total moles of (i) and (ii),
   b. an α,β-unsaturated carboxyl compound,
   c. optionally a carboxyl component other than said α,β-unsaturated carboxyl compound (b), comprising a polycarboxylic acid compound, a derivative of polycarboxylic acid compound, or a combination thereof, and
II. an alkyl acetoacetate and/or diketene in an amount ranging from about 3 to about 50 weight percent, based on the total weight of (I) and (II).

The mole percent of the diol component of (a)(i) can be 50 to 100, 55 to 95, 60 to 90, 65 to 85, or 70 to 80 and the polyol of (a)(ii) can be 0 to 50, 5 to 45, 10 to 40, 15 to 35 or 20 to 30, based on the total moles of (i) and (ii).

The mole percent of the α,β-unsaturated carboxyl compound (b) can be 10 to 100, 20 to 90, 30 to 80, 35 to 70, or 40 to 60, based on the total moles of the carboxyl components, (b) and (c). In one embodiment, the mole percent is 35 to 70 or 40 to 60.

The weight percent of the alkyl acetoacetate and/or diketene (II) can be 3 to 50, 5 to 40, 7 to 35, 10 to 30, or 12 to 25, based on the total weight of (I) and (II).

In some embodiments the hydroxyl component (a) include diols such as 2,2,4,4-tetraalkylcyclobutane-1,3-diol (TACD), 2,2-dimethyl-1, 3-propanediol (neopentyl glycol), 1,2-cyclohexanedimethanol, 1, 3-cyclohexanedimethanol, 1,4-cyclohexanedimethanol, 2,2,4-trimethyl-1, 3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, hydrogenated bisphenol A, ethylene glycol, propylene glycol, diethylene glycol, dipropylene glycol, triethylene glycol, tetraethylene glycol, and polyethylene glycol, and polyols such as 1,1,1-trimethylol propane, 1,1,1-trimethylolethane, glycerin, pentaerythritol, erythritol, threitol, dipentaerythritol, sorbitol, and combinations thereof.

Examples of said 2,2,4,4-tetraalkylcyclobutane-1,3-diols (TACD) include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, and 2,2,4,4-tetra-n-butylcyclobutane-1,3-diol. In some embodiments, the diol (a)(i) comprises one or more selected from the group consisting of 2,2,4,4-tetramethylcyclobutane-1,3-diol, 2,2-dimethyl-1, 3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol. In other embodiments, the polyol (a)(ii) is selected from 1,1,1-trimethylol propane, 1,1,1-trimethylolethane, glycerin, and pentaerythritol.

In some embodiments the α,β-unsaturated carboxyl compound (b) is a compound having an α,β-unsaturated group such as, but are not limited to, maleic anhydride, maleic acid, fumaric acid, itaconic anhydride, itaconic acid, citraconic anhydride, citraconic acid, aconitic acid, aconitic anhydride oxalocitraconic acid and its anhydride, mesaconic acid or its anhydride, phenyl maleic acid or its anhydride, t-butyl maleic acid or its anhydride, monomethyl fumarate, monobutyl fumarate, methyl maleic acid or its anhydride, or mixtures thereof. In addition, the esters of said acids such as, for example, dimethyl maleate, dimethyl fumarate, dimethyl itaconate, diethyl maleate, diethyl fumarate, diethyl itaconate, and the like are also suitable In some embodiments the carboxyl component (c) may be a polycarboxylic acid compound, a derivative of polycarboxylic acid compound, or a combination thereof. Suitable polycarboxylic acid compounds include compounds having at least two carboxylic acid groups. In one aspect, the polycarboxylic acid compound comprises a dicarboxylic acid compound having two carboxylic acid groups, derivatives thereof, or combinations thereof, capable of forming an ester linkage with a polyhydroxyl component. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride. In another aspect, the polycarboxylic acid compound comprises a tricarboxylic acid or anhydride, for example, trimellitic acid or trimellitic anhydride.

Examples of dicarboxylic acids that may be used include aliphatic dicarboxylic acids, alicyclic dicarboxylic acids, aromatic dicarboxylic acids, derivatives of each, or mixtures of two or more of these acids. Thus, suitable dicarboxylic acids include, but are not limited to, isophthalic acid (or dimethyl isophthalate), terephthalic acid (or dimethyl terephthalate), phthalic acid, phthalic anhydride, 1,4-cyclohexane-dicarboxylic acid, 1,3-cyclohexanedicarboxylic acid, hexahydrophthalic anhydride, tetrahydrophthalic anhydride, tetrachlorophthalic anhydride, dodecanedioic acid, sebacic acid, azelaic acid, succinic anhydride, succinic acid, adipic acid, 2,6-naphthalenedicarboxylic acid, glutaric acid, and their derivatives, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

In some embodiments, the carboxyl component (c) comprises one or more selected from the group consisting of isophthalic acid (or dimethyl isophthalate), terephthalic acid (or dimethyl terephthalate), phthalic acid, phthalic anhydride, 1,4-cyclohexane-dicarboxylic acid, 1,3-cyclohexanedicarboxylic acid, adipic acid, 2,6-naphthalene-dicarboxylic acid, 1,4-naphthalenedicarboxylic acid; 2,5-naphthalenedicarboxylic acid; hexahydrophthalic anhydride (HHPA), tetrahydrophthalic anhydride, trimellitic anhydride, succinic anhydride, and succinic acid. In other embodiments, the carboxyl compound (b) is selected from the group consisting of isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, adipic acid, hexahydrophthalic anhydride, and succinic anhydride.

Examples of said alkyl acetoacetate (II) include t-butyl acetoacetate, methyl acetoacetate, ethyl acetoacetate, n-propyl acetoacetate, isopropyl acetoacetate, n-butyl acetoacetate, and the like.

The glass transition temperature (Tg) of the self-curable polyester of the present invention may be from −40° C. to 120° C., from −10° C. to 100° C., from 20° C. to 80° C., or from 30° C. to 70° C. Depending on the applications, the polyesters can have low Tg's or high Tg's. For example, low Tg polyesters are more desirable for adhesive applications, while high Tg polyesters are more desirable for coating applications.

The weight average molecular weight (Mw) of the self-curable polyester of the present invention may be from 1,000 to 100,000; from 1,500 to 50,000; from 2,000 to 10,000; or from 2,500 to 5,000 g/mole. The polyester may be linear or branched. The Mw is measured by gel permeation chromatography (GPC) using polystyrene equivalent molecular weight.

The curable composition further comprises a base catalyst (B) in an amount ranging from 0.1 to 10, 0.2 to 7, 0.3 to 6, or 0.5 to 5 weight percent, based on the weight of the self-curable polyester (A).

Examples of the base catalyst include amidine type catalysts such as 1,8-diazabicyclo-[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), and 1,1,3,3-tetramethylguanidine (TMG), bicyclic unhindered tertiary amine type catalysts such as 1,4-diazabicyclo[2.2.2]octane (DABCO), tertiary amine type catalysts such as triethylamine and N,N-dimethylethanolamine, quaternary ammonium compound catalysts such as ammonium hydroxide and tetrabutyl ammonium hydroxide, phosphine type catalysts such as triphenyl phosphine and tributyl phosphine, and inorganic bases such as sodium hydroxide and potassium hydroxide, and mixtures thereof. In some embodiments of the invention, the amidine type, the bicyclic unhindered tertiary amine type, and the tertiary amine type catalysts are desirable.

In some embodiments of the invention, the desirable catalyst is the amidine type catalyst, such as 1,8-diazabicyclo-[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), and 1,1,3,3-tetramethylguanidine (TMG).

In order to extend the pot life of the curable composition, the base catalyst may be temporarily blocked. For example, an alcohol such as methanol or ethanol may be added to the composition on storage to block the catalyst. When the composition is applied, the alcohol will evaporate and the catalyst de-blocked. A carboxylic acid, such as benzoic acid, acetic acid, or cyanoacetic acid, can also be added to the composition to block the catalyst and subsequently deblock by heating. Such techniques for blocking and deblocking the amidine catalysts have been disclosed in Progress in Organic Coatings, 32 (1997), 137-142 by Arie Noomen.

Moreover, the present inventors have found that methanol is surprisingly much more effective in blocking the basic catalyst such as 1,8-diazabicyclo-[5.4.0]undec-7-ene (DBU). Solvent-borne coatings formulated with DBU in methanol (e.g. 25% by weight) have been found to remain fluid over time and had significantly less viscosity increase than those formulated with DBU in n-propanol or ethanol.

Thus, in a further embodiment, the curable composition further comprises a catalyst-blocking agent. Examples of such blocking agents include alcohols, such as methanol, ethanol, isopropanol, n-propanol, and the like, and carboxylic acids such as benzoic acid, formic acid, acetic acid, and cyanoacetic acid.

The curable composition is capable of reacting at an ambient temperature in the presence of a base catalyst. In a so-called 2K system, it is required to mix the two components shortly before use to prevent the composition from premature crosslinking and becoming useless. In the present invention, there is no need to add another component other than the base catalyst since the polyester is self-curable. The self-curable polyester is not reactive without a catalyst; thus, it is storage stable. The base catalyst can be added to the curable composition shortly before use to trigger the curing process. A blocked base catalyst may be added to the self-curable polyester for long-term storage. Thus, this invention further provides a one-pack curable composition, which can be stored and used without the need of adding another component to trigger the reaction. The curing occurs when the composition is applied and the catalyst deblocked, for example, by the evaporation of the blocking agent.

The curable composition may further comprise an organic solvent. Suitable organic solvents include xylene, ketones (for example, methyl amyl ketone and methyl ethyl ketone), 2-butoxyethanol, ethyl-3-ethoxypropionate, toluene, butanol, cyclopentanone, cyclohexanone, ethyl acetate, butyl acetate, and other volatile inert solvents typically used in industrial coatings. The amount of solvents can range from 0% to 70%, 5% to 50%, or 10% to 30% based on the total weight of the curable composition.

In one embodiment, the curable composition is a coating composition suitable for applications in coatings such as automotive, industrial maintenance, metal can, and furniture. The curing temperature for such coating applications can range from room temperature to about 230° C. The low-temperature curable composition is especially suitable for field-applied industrial maintenance coatings, automotive refinish coatings, wood coatings, and marine craft gelcoats. The composition can also be used for architecture coatings, for example, as a replacement for alkyd paint in order to meet the needs for quick drying, reduced dirt pick up, improved block resistance, and eliminating the use of metal driers such as cobalt and zirconium.

The present inventors have surprisingly found that the acetoacetate-functionalized unsaturated polyester composition comprising 2,2,4,4-tetramethylcyclobutane-1,3-diol (TMCD) as one of the diol components and hexahydrophthalic anhydride (HHPA) as one of the carboxyl components can provide coatings with excellent weatherability desirable for outdoor applications.

Thus, in a further embodiment, this invention provides a coating composition comprising:
    A. an acetoacetate-functionalized unsaturated polyester comprising the reaction product of:
        I. an unsaturated polyester in an amount from about 50 to about 97 weight percent, based on the total weight of (I) and (II), comprising the residues of:

a. a hydroxyl component comprising:
   i. 2,2,4,4-tetramethylcyclobutane-1,3-diol (TMCD) in an amount ranging from 10 to 90 mole %, based on the total moles of (i), (ii), and (iii),
   ii. a diol other than TMCD in an amount ranging from 10 to 90 mole percent, based on the total moles of (i), (ii), and (iii), and
   iii. a polyol in an amount ranging from 0 to 50 mole percent, based on the total moles of (i), (ii), and (iii);
b. an α,β-unsaturated carboxyl compound;
c. hexahydrophthalic anhydride (HHPA); and
d. optionally a third carboxyl component in addition to (b) and (c), other than said α,β-unsaturated carboxyl compound and said HHPA wherein said optional third carboxyl component is a polycarboxylic acid compound, a derivative of polycarboxylic acid compound, or a combination thereof; and
II. an alkyl acetoacetate and/or diketene in an amount ranging from about 3 to about 50 weight percent, based on the total weight of (I) and (II); and
B. a basic catalyst.

In one aspect, said TMCD (i) is in an amount from 20 to 80, 30 to 70, or 40 to 60 mole %, the diol (ii) in an amount from 20 to 80, 30 to 70, or 40 to 60 mole %, and the polyol (III) in an amount from 5 to 45, 10 to 40, 15 to 35, 20 to 30 mole %, based on the total moles of (i), (ii), and (iii). In one embodiment, said TMCD (i) is in an amount from 30 to 70 mole %, said diol (ii) in an amount from 30 to 70, and said polyol (iii) in an amount from 10 to 40 mole %, based on the total moles of (i), (ii), and (iii).

In another aspect, said α,β-unsaturated carboxyl compound (b) is in an amount of about 30 to about 70 mole percent, HHPA (c) in an amount of about 30 to about 70 mole percent, and (d) in an amount of 0 to about 40 mole percent based on the total moles of the carboxyl components, (b), (c), and (d). In some embodiments, (b) is 35 to 65, 40 to 60, or 45 to 55 mole percent, (c) is 35 to 65, 40 to 60, or 45 to 55 mole percent, and (d) is 5 to 35, 10 to 30, or 15 to 25 mole percent, based on the total moles of the carboxyl components, (b), (c), and (d).

In still another aspect, said unsaturated polyester (I) is in an amount of 70 to 90 weight percent and said alkyl acetoacetate and/or diketene (II) is in an amount of 10 to 30 weight percent, all based on the total weight of (I) and (II).

Examples of the diol other than TMCD (ii) is one or more selected from the group comprising 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, and 1,6-hexanediol. 2,2-Dimethyl-1,3-propanediol (neopentyl glycol) is most desirable.

Examples of the polyol (iii) include 1,1,1-trimethylol propane, 1,1,1-trimethylolethane, glycerin, and pentaerythritol.

Examples of the carboxyl component (d) include isophthalic acid (or dimethyl isophthalate), terephthalic acid (or dimethyl terephthalate), phthalic acid, phthalic anhydride, 1,4-cyclohexanedicarboxylic acid, 1,3-cyclohexanedicarboxylic acid, adipic acid, and succinic anhydride. Adipic acid is most desirable.

Example of the α,β-unsaturated carboxyl compound (b) is selected from the group comprising maleic anhydride, maleic acid, fumaric acid, itaconic acid, and itaconic anhydride.

Examples of the alkyl acetoacetate (II) and the basic catalyst (B) in said coating composition have been described under the broader coating composition of the present invention.

In another aspect, said acetoacetate-functionalized unsaturated polyester is an all aliphatic polyester.

The glass transition temperature (Tg) of the acetoacetate-functionalized unsaturated polyester in said coating composition may be from −40° C. to 120° C., from −10° C. to 100° C., from 20° C. to 80° C., or from 30° C. to 70° C.

The weight average molecular weight (Mw) of the acetoacetate-functionalized unsaturated polyester in said coating composition may be from 1,000 to 100,000; from 1,500 to 50,000; from 2,000 to 10,000; or from 2,500 to 5,000 g/mole. The polyester may be linear or branched. The Mw is measured by gel permeation chromatography (GPC) using polystyrene equivalent molecular weight.

The coating composition further comprises a base catalyst (B) in an amount ranging from 0.1 to 10, 0.2 to 7, 0.3 to 6, or 0.5 to 5 weight percent, based on the weight of the acetoacetate-functionalized unsaturated polyester (A).

The curable composition may further comprise an amino crosslinker and/or phenolic resin. Suitable amino crosslinkers include hexamethoxymethyl-melamine, tetramethoxymethylbenzoguanamine, tetramethoxymethylurea, mixed butoxy/methoxy substituted methylmelamines, and the like. Suitable phenolic resins include PHENODUR PR371/70B, PHENODUR® PR 516/60B, PHENODUR® PR 612/80B available from Allnex.

After formulation, the coating composition can be applied to a substrate or article. Thus, a further aspect of the present invention is a shaped or formed article that has been coated with the coating compositions of the present invention. The substrate can be any common substrate such as paper; polymer films such as polyethylene or polypropylene; wood; metals such as aluminum, steel or galvanized sheeting; glass; urethane elastomers; primed (painted) substrates; and the like. The coating composition can be coated onto a substrate using techniques known in the art, for example, by spraying, draw-down, roll-coating, etc., to form a dried coating having a thickness of about 0.1 to about 4 mils (1 mil=25 μm), or 0.5 to 3, or 0.5 to 2, or 0.5 to 1 mils on the substrate. The coating can be cured at ambient temperatures such as room temperature or by heating to a temperature of about 50° C. to about 200° C. for a time period that typically ranges from about a few seconds to about 60 minutes and allowed to cool.

EXAMPLES

Example 1. Synthesis of Self-Curable Polyester 1 (SC Polyester 1)

Unsaturated Polyester 1:
A 2-L kettle with a four-neck lid was equipped with a mechanical stirrer, a thermocouple, a heated partial condenser (115° C.), a Dean-Stark trap, and a chilled condenser (15° C.). To the flask were charged 2,2,4,4-tetramethylcyclobutane-1,3-diol (367.7 g), hexahydrophthalic anhydride (388.5 g), and the catalyst, Fascat 4100, (1.83 g). The stirred mixture was gradually heated to 190'C and hold for 5 hours. An amount of 16.7 g of the condensate was obtained. To the reaction mixture were added the second stage reactants:

neopentyl glycol (265.6 g) and trimethylolpropane (32.24 g). The temperature was ramped up to 230° C. and held for 2 hours; a total of 25.1 g of the condensate was obtained. The reaction mixture was then held at 150° C. overnight and subsequently restarted by heating to 230'C. The reaction was allowed to continue for 3.5 hours to yield a total of 39.5 g condensate. The acid number was determined to be 1.7 mgKOH/g. The mixture was cooled to 170° C. and the third stage reactant, maleic anhydride, was added. The temperature was ramped up to 230° C.; the reaction was allowed to continue for 5.5 hours and subsequently terminated. A total of 70.7 g of the condensate was obtained. The resulting polyester had an acid number of 6.0 mgKOH/g; a hydroxyl number of 95.1 mgKOH/g; a glass transition temperature (Tg) of 26.15° C.; a number average molecular weight (Mn) of 1558 g/mole; and a weight average molecular weight (Mw) of 3367 g/mole.

Acid number was determined by the titration method in accordance with ASTM D974. Hydroxyl number was determined by first reacting the OH group with acetic anhydride to yield the COOH functionality, which was then titrated and back calculated. Molecular weights were measured by gel permeation chromatography (GPC) using polystyrene equivalent molecular weight. Glass transition temperature (Tg) was determined using a TA DSC 2920 from Thermal Analyst Instrument at a scan rate of 20° C./min.

Self-Curable Polyester 1 (SC Polyester 1):

The next synthesis was aimed to convert the hydroxyl number of 50 mgKOH/g of the above unsaturated polyester (1) to an acetoacetate number of 50 mgKOH/g. To a 500 mL, three-neck, round-bottom flask equipped with a mechanical stirrer, a heated partial condenser, a Dean-Stark trap, and a water condenser were added the above unsaturated polyester 1 (100.0 g) and t-butyl acetoacetate (14.08 g). The mixture was gradually heated and allowed to react at 120° C. for 40 minutes and at 140° C. for two hours. A total of 6.5 ml of the condensate (t-butanol) was collected in the Dean-Stark adapter. The resulting viscous polyester resin was allowed to cool and subsequently collected. The polyester had a glass transition temperature (Tg) of 13° C.; a number average molecular weight (Mn) of 1607 g/mole; and a weight average molecular weight (Mw) of 3388 g/mole.

Example 2. Synthesis of Self-Curable Polyester 2 (SC Polyester 2)

Unsaturated Polyester 2:

A 2-L kettle with a four-neck lid was equipped with a mechanical stirrer, a thermocouple, a heated partial condenser (115° C.), a Dean-Stark trap, and a chilled condenser (15° C.). To the flask were charged 2,2,4,4-tetramethylcyclobutane-1,3-diol (TMCD, 200.0 g), hexahydrophthalic anhydride (194.2 g), and the catalyst, Fascat 4100, (1.81 g). The stirred mixture was gradually heated to 190° C. and hold for 5 hours. An amount of 7.6 g of the condensate was obtained. To the reaction mixture were added the second stage reactants: neopentyl glycol (265.6 g), TMCD (167.7 g), trimethylolpropane (32.24 g), and adipic acid (184.1 g). The temperature was ramped up to 230° C. and held for 2 hours; a total of 52.4 g of the condensate was obtained. The reaction mixture was then held at 150° C. overnight and subsequently restarted by heating to 230° C. The reaction was allowed to continue for 3.5 hours to yield a total of 59.7 g condensate. The acid number was determined to be 2.1 mgKOH/g. The mixture was cooled to 170° C. and the third stage reactant, maleic anhydride, was added. The temperature was ramped up to 230° C.; the reaction was allowed to continue for 4 hours and subsequently terminated. A total of 98.7 g of the condensate was obtained. The resulting polyester had an acid number of 5.7 mgKOH/g; a hydroxyl number of 107.4 mgKOH/g; a glass transition temperature (Tg) of –0.6° C.; a number average molecular weight (Mn) of 1757 g/mole; and a weight average molecular weight (Mw) of 4191 g/mole.

Self-Curable Polyester 2 (SC Polyester 2):

The next synthesis was aimed to convert the hydroxyl number of 50 mgKOH/g of the above unsaturated polyester (2) to an acetoacetate number of 50 mgKOH/g. To a 500 mL, three-neck, round-bottom flask equipped with a mechanical stirrer, a heated partial condenser, a Dean-Stark trap, and a water condenser were added the above unsaturated polyester 2 (100.0 g) and t-butyl acetoacetate (14.08 g). The mixture was gradually heated and allowed to react at 120° C. for 40 minutes and at 140° C. for two hours. A total of 7 ml of the condensate (t-butanol) was collected in the Dean-Stark adapter. The resulting viscous polyester resin was allowed to cool and subsequently collected. The polyester had a glass transition temperature (Tg) of –7.4° C.; a number average molecular weight (Mn) of 1925 g/mole; and a weight average molecular weight (Mw) of 4613 g/mole.

Example 3. Synthesis of Self-Curable Polyester 3 (SC Polyester 3)

Unsaturated Polyester 3:

A 2-L kettle with a four-neck lid was equipped with a mechanical stirrer, a thermocouple, a heated partial condenser (115° C.), a Dean-Stark trap, and a chilled condenser (15° C.). To the flask were charged neopentyl glycol (265.6 g), 2,2,4,4-tetramethylcyclobutane-1,3-diol (367.7 g), trimethylolpropane (TMP) (32.24 g), isophthalic acid (418.7 g), and Fascat 4100 (1.87 g). The reaction temperature was increased to 140° C. at 1.4° C./min. and then to 230° C. at 0.44° C./min.; the reaction was stopped after a total of 10 hours. A total of 138.6 g (organic layer, 30 g) of the distillate was collected in the Dean-Stark trap. The resulting polyester resin was allowed to cool to room temperature and subsequently collected. The polyester had an acid number of 7.8 mgKOH/g; a hydroxyl number of 98.5 mgKOH/g; a glass transition temperature (Tg) of 41.91° C.; a number average molecular weight (Mn) of 1827 g/mole; and a weight average molecular weight (Mw) of 4580 g/mole.

Self-Curable Polyester 3 (SC Polyester 3):

The next synthesis was aimed to convert the hydroxyl number of 50 mgKOH/g of the above unsaturated polyester (3) to an acetoacetate number of 50 mgKOH/g.

To a 500 mL, three-neck, round-bottom flask equipped with a mechanical stirrer, a heated partial condenser, a Dean-Stark trap, and a water condenser were added the above unsaturated polyester 3 (200.0 g) and t-butyl acetoacetate (28.16 g). The mixture was gradually heated and allowed to react at 120° C. for 40 minutes and at 140° C. for two hours. A total of 13 ml of the condensate (t-butanol) was collected in the Dean-Stark adapter. The resulting viscous polyester resin was allowed to cool and subsequently collected. The polyester had a glass transition temperature (Tg) of 27° C.; a number average molecular weight (Mn) of 1926 g/mole; and a weight average molecular weight (Mw) of 4680 g/mole.

Example 4. Formulation and Evaluation of Curable Coating Compositions

Formulations 1-3 were prepared by using SC polyesters 1-3 in MAK (50%). As shown in Table 1, to each polyester solution (50 weight % in MAK) were added the catalyst, 1,8-diazabicyclo-[5.4.0]undec-7-ene (DBU) in n-propanol (25 weight percent), the hindered-amine light stabilizer, Tinuvin 292, and the UV absorber, Tinuvin 400 (both available from BASF). The resulting coating formulations were drawn down on cold-rolled steel test panels with a precoated epoxy primer. The coatings (thickness, about 75 μm) thus obtained were then allowed to cure at 60° C. for two hours and then at room temperature for two weeks. The curing was monitored by König Pendulum Hardness Tester (BYI-Gardner) (ASTM D4366). The pendulum hardness and the gloss of the coatings are listed in Table 2.

TABLE 1

Formulations Based on Self-Curable Polyesters

| Formulation | Polyester | Polyester solution (wt. % in MAK) | Polyester solution, gram | Catalyst, DBU in n-propanol (25%), gram | Tinuvin 292 (100%), gram | Tinuvin 400 (50% in MAK), gram |
|---|---|---|---|---|---|---|
| 1 | SC Polyester 1 | 50% | 10 | 0.8 | 0.05 | 0.12 |
| 2 | SC Polyester 2 | 50% | 10 | 0.96 | 0.06 | 0.12 |
| 3 | SC Polyester 3 | 50% | 10 | 0.96 | 0.06 | 0.12 |

TABLE 2

Coating Properties

| | Formulation Observation | | | Coating properties after baking at 60° C. for 2 hours | |
|---|---|---|---|---|---|
| Formulation | After 1 hour | After 3 hours | Overnight | Pendulum Hardness (sec.) | Gloss |
| 1 | Yellow liquid (flow well) | Little change | Yellow, viscous liquid | 45 | 20° = 83.4<br>60° = 88.6<br>85° = 99.4 |
| 2 | Yellow liquid (flow well) | Little change | Yellow, soft gel | 52 | 20° = 84.0<br>60° = 88.6<br>85° = 99.3 |
| 3 | Yellow liquid (flow well) | Little change | Yellow, soft gel | 39 | 20° = 90.2<br>60° = 93.8<br>85° = 99.9 |

Example 5. Accelerated Weathering Study of the Coatings

The coatings (1, 2, and 3) prepared from formulations 1-3 in Example 4 were subject to accelerated weathering study in accordance with ASTM Method G155. The gloss retention results are listed in Table 3.

TABLE 3

Accelerated Weathering Study

| | 60 Degree Gloss Retention (%) | | | 20 Degree Gloss Retention (%) | | |
|---|---|---|---|---|---|---|
| Coating | After 500 hrs. | After 1000 hrs. | After 1500 hrs. | After 500 hrs. | After 1000 hrs. | After 1500 hrs. |
| 1 | 98.5 | 98.6 | 90.1 | 90.0 | 86.2 | 55.0 |
| 2 | 98.7 | 99.0 | 99.8 | 89.7 | 94.1 | 91.9 |
| 3 | 96.9 | 74.8 | <50 | 88.8 | 47.3 | <50 |

The invention has been described in detail with particular reference to preferred embodiments thereof, but it will be understood that variations and modifications can be affected within the spirit and scope of the invention.

We claim:
1. A coating composition comprising:
   A. an acetoacetate-functionalized unsaturated polyester comprising the reaction product of:
      I. an unsaturated polyester in an amount from about 50 to about 97 weight percent, based on the total weight of (I) and (II), the unsaturated polyester comprising the residues of:
         a. a hydroxyl component comprising:
            i. 2,2,4,4-tetramethylcyclobutane-1,3-diol (TMCD) in an amount ranging from 10 to 90 mole %, based on the total moles of (i), (ii), and (iii),
            ii. a diol other than TMCD in an amount ranging from 10 to 90 mole percent, based on the total moles of (i), (ii), and (iii), and
            iii. a polyol in an amount ranging from 0 to 50 mole percent, based on the total moles of (i), (ii), and (iii);
         b. an α,β-unsaturated carboxyl compound;
         c. hexahydrophthalic anhydride (HHPA); and
         d. optionally a third carboxyl component in addition to (b) and (c), other than said α,β-unsaturated carboxyl compound and said HHPA, wherein said optional third carboxyl component is a polycarboxylic acid compound, a derivative of polycarboxylic acid compound, or a combination thereof; and
      II. an alkyl acetoacetate or a combination of alkyl acetoacetate and diketene in an amount ranging from about 3 to about 50 weight percent, based on the total weight of (I) and (II); and
   B. a basic catalyst;
   wherein said α,β-unsaturated carboxyl compound (b) is in an amount of 30 to 70 mole percent, said HHPA

(c) in an amount of 30 to 70 mole percent, and said third carboxyl component (d) in an amount of 0 to 40 mole percent, based on the total moles of the carboxyl components, (b), (c), and (d); and wherein the coating upon being cured has 60 degree gloss retention of greater than 85% after 1500 hours as tested in accordance with ASTM G155; and wherein the coating composition does not contain a phenolic resin.

2. The coating composition of claim 1, wherein said diol (ii) is 2, 2-dimethyl-1,3-propanediol (neopentyl glycol), 1,2-cyclohexanedimethanol, 1, 3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 1,4-butanediol, 1,6-hexanediol, or mixtures thereof.

3. The coating composition of claim 1, wherein said diol (ii) is 2, 2-dimethyl-1,3-propanediol.

4. The coating composition of claim 1, wherein said polyol (iii) is 1, 1,1-trimethylol propane, 1,1,1-trimethylolethane, glycerin, pentaerythritol or mixtures thereof.

5. The coating composition of claim 1, wherein said carboxyl component (d) is isophthalic acid, dimethyl isophthalate, terephthalic acid dimethyl terephthalate, phthalic acid, phthalic anhydride, 1,4-cyclohexanedicarboxylic acid, 1,3-cyclohexane-dicarboxylic acid, adipic acid, succinic anhydride or mixtures thereof.

6. The coating composition of claim 1, wherein said α,β-unsaturated carboxyl compound (b) is selected from the group consisting of maleic anhydride, maleic acid, fumaric acid, itaconic acid, and itaconic anhydride.

7. The coating composition of claim 1, wherein said TMCD (i) is in an amount from 30 to 70 mole%, said diol (ii) in an amount from 30 to 70, and said polyol (iii) in an amount from 10 to 40 mole%, based on the total moles of (i), (ii), and (iii).

8. The coating composition of claim 1, wherein said acetoacetate-functionalized unsaturated polyester is an all aliphatic polyester.

9. The coating composition of claim 1, wherein said unsaturated polyester (I) is in an amount of 70 to 90 weight percent and said alkyl acetoacetate or said combination of alkyl acetoacetate and diketene (II) is in an amount of 10 to 30 weight percent, based on the total weight of (I) and (II).

10. The coating composition of claim 1, wherein said alkyl acetoacetate (II) is t-butyl acetoacetate.

11. The coating composition of claim 1, wherein said basic catalyst (B) comprises 1,8-diazabicyclo[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), 1,1,3,3-tetramethylguanidine (TMG), 1,4-diazabicyclo[2.2.2]octane (DABCO), triethylamine, N,N-dimethylethanolamine, ammonium hydroxide, triphenyl phosphine, and tributyl phosphine or mixtures thereof.

12. The coating composition of claim 1, wherein said basic catalyst (B) is one or more selected from the group consisting of 1,8-diazabicyclo[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), and 1,1,3,3-tetramethylguanidine (TMG).

13. The coating composition of claim 1, wherein said basic catalyst (B) is in an amount ranging from 0.5 to 5 weight percent based on the weight of the acetoacetate-functionalized unsaturated polyester (A).

14. The coating composition of claim 1 further comprising one or more organic solvents.

15. The coating composition of claim 14 wherein said organic solvents comprise xylene, methyl amyl ketone, methyl ethyl ketone, 2-butoxyethanol, ethyl-3-ethoxypropionate, toluene, propanol, butanol, cyclopentanone, cyclohexanone, ethyl acetate, butyl acetate or mixtures thereof.

16. The coating composition of claim 1, wherein said basic catalyst (B) is a solution of 1,8-diazabicyclo[5.4.0]undec-7-ene (DBU) in methanol.

\* \* \* \* \*